United States Patent
Li et al.

(10) Patent No.: US 11,754,446 B2
(45) Date of Patent: Sep. 12, 2023

(54) THERMAL IMAGING APPARATUS AND TEMPERATURE CALIBRATION METHOD OF THERMAL IMAGING APPARATUS

(71) Applicant: INDUSTRIAL TECHNOLOGY RESEARCH INSTITUTE, Hsinchu (TW)

(72) Inventors: Chia-Chang Li, Pingtung (TW); Shih-Chun Chang, Tainan (TW); Jay Huang, Tainan (TW); Wen-Hung Ting, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 103 days.

(21) Appl. No.: 17/217,849

(22) Filed: Mar. 30, 2021

(65) Prior Publication Data
US 2022/0163395 A1    May 26, 2022

(30) Foreign Application Priority Data

Nov. 20, 2020  (TW) .................................. 109140755

(51) Int. Cl.
*G01J 5/00*  (2022.01)
*G01J 5/0806*  (2022.01)
(Continued)

(52) U.S. Cl.
CPC ........... *G01J 5/0025* (2013.01); *G01J 5/0275* (2013.01); *G01J 5/0806* (2013.01); *G01J 5/485* (2022.01);
(Continued)

(58) Field of Classification Search
CPC ...... G01J 5/0025; G01J 5/0275; G01J 5/0806; G01J 5/485; G01J 5/80; G01J 2005/0077; G01C 3/00
See application file for complete search history.

(56) References Cited

U.S. PATENT DOCUMENTS

| | | |
|---|---|---|
| 10,116,885 B2 | 10/2018 | Beall |
| 2010/0045809 A1 | 2/2010 | Packard |

(Continued)

FOREIGN PATENT DOCUMENTS

| | | |
|---|---|---|
| CN | 107067470 A | 8/2017 |
| CN | 107941342 A | 4/2018 |

(Continued)

OTHER PUBLICATIONS

Sumriddetchkajorn et al., "Field test studies of our infared-based human temperature screening system embedded with a parallel measurement approach" Infrared Physics & Technology 52 (2009) 119-123, Apr. 21, 2009.

(Continued)

*Primary Examiner* — Christine S. Kim
(74) *Attorney, Agent, or Firm* — Maschoff Brennan (57) ABSTRACT

A thermal imaging apparatus for measuring a temperature of a target in a monitored area comprises a thermal imager, an optical image capturing device and a computing processing device. The thermal imager is configured to capture a thermal image of the monitored area. The optical image capturing device is configured to capture optical images of the monitored area. The computing processing device is configured to determine one of the optical images as a determined optical image synchronizing with the thermal image according to positions of blocks corresponding to the target in the thermal image and the optical images, perform calculation according to the thermal image and the determined optical image to obtain a measured distance between (Continued)

the target and the thermal imaging apparatus, and perform calibration according to the measured distance and the thermal image to obtain a calibrated temperature value of the target.

16 Claims, 5 Drawing Sheets

(51) Int. Cl.
  *G01J 5/02* (2022.01)
  *G01J 5/80* (2022.01)
  *G01J 5/48* (2022.01)
(52) U.S. Cl.
  CPC ......... *G01J 5/80* (2022.01); *G01J 2005/0077* (2013.01)

(56) References Cited

U.S. PATENT DOCUMENTS

| | | | |
|---|---|---|---|
| 2015/0181265 A1 | 6/2015 | Clavenna et al. | |
| 2016/0295208 A1* | 10/2016 | Beall | G06T 7/20 |
| 2016/0316154 A1* | 10/2016 | Elmfors | G01J 5/53 |
| 2018/0302555 A1* | 10/2018 | Chew | G01J 5/0846 |
| 2022/0201277 A1* | 6/2022 | Ko | G06T 7/80 |
| 2023/0054197 A1* | 2/2023 | Richards | G01J 5/0806 |

FOREIGN PATENT DOCUMENTS

| | | | |
|---|---|---|---|
| CN | 111223225 A | | 6/2020 |
| CN | 111339951 A | | 6/2020 |
| CN | 111412994 A | | 7/2020 |
| CN | 111426394 A | | 7/2020 |
| KR | 2022036418 A | * | 3/2022 |
| TW | I613426 B | | 2/2018 |
| TW | I704502 B | | 9/2020 |

OTHER PUBLICATIONS

Somboonkaew et al., "Mobile-platform for automatic fever screening system based on infrared forehead temperature" Photonics Technology Laboratory, National Electronics and Computer Technology Center, National Science and Technology Development Agency, Jul. 31, 2017.

Somboonkaew et al., "Temperature-compensated infaredbased low-cost mobile platform module for mass human temperature screening" Applied Optics, vol. 59, No. 17, Jun. 10, 2020.

TW Office Action in Application No. 109140755 dated Jul. 29, 2021.

* cited by examiner

RGB4

THERMAL IMAGING APPARATUS AND TEMPERATURE CALIBRATION METHOD OF THERMAL IMAGING APPARATUS

CROSS-REFERENCE TO RELATED APPLICATIONS

This non-provisional application claims priority under 35 U.S.C. § 119(a) on Patent Application No(s). 109140755 filed in Taiwan (ROC) on Nov. 20, 2020, the entire contents of which are hereby incorporated by reference.

BACKGROUND

1. Technical Field

The disclosure relates to a thermal imaging apparatus, and particularly to a thermal imaging apparatus which has a function of temperature calibration.

2. Related Art

In response to the circumstance of the COVID-19 global pandemic, the airports and the other public spaces in each country are equipped with epidemic prevention mechanisms for temperature screening. In comparison to the manual measurement, the thermal image screening can effectively reduce the measurement time for a large number of pedestrians. However, since heat radiation decays in the medium space, the temperature value of the target measured by the thermal imager varies depending on the distance between the target and the thermal imager, which will cause errors in body temperature measurement.

SUMMARY

According to one or more embodiment of the disclosure, a thermal imaging apparatus for measuring a temperature of a target in a monitored area comprises a thermal imager, an optical image capturing device and a computing processing device, wherein the computing processing device is connected to the thermal imager and the optical image capturing device. The thermal imager is configured to capture a thermal image of the monitored area. The optical image capturing device is configured to capture optical images of the monitored area. The computing processing device is configured to determine one of the optical images as a determined optical image synchronizing with the thermal image according to positions of blocks corresponding to the target in the thermal image and the optical images, perform calculation according to the thermal image and the determined optical image to obtain a measured distance between the target and the thermal imaging apparatus, and perform calibration according to the measured distance and the thermal image to obtain a calibrated temperature value of the target.

According to one or more embodiment of the disclosure, a temperature calibration method of a thermal imager is applicable for a thermal imaging apparatus for obtaining a temperature of a target in a monitored area. The temperature calibration method comprises obtaining a thermal image in the monitored area, obtaining optical images in the monitored area, determining one of the optical images as a determined optical image synchronizing with the thermal image according to positions of blocks corresponding to the target in the thermal image and the optical images, performing calculation according to the thermal image and the determined optical image to obtain a measured distance between the target and the thermal imaging apparatus, and performing calibration according to the measured distance and the thermal image to obtain a calibrated temperature value of the target.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
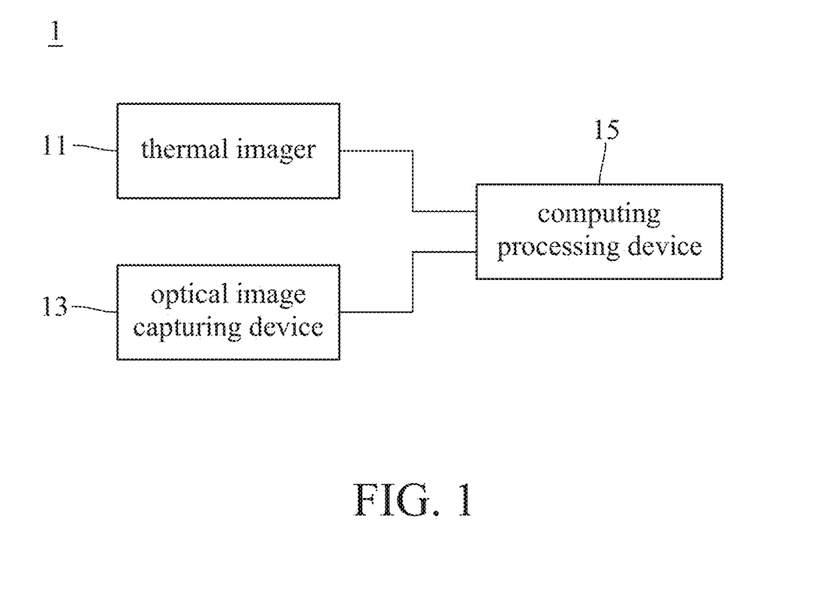
FIG. 1 is a functional block diagram of a thermal imaging apparatus according to an embodiment of the disclosure.

The thermal imaging apparatus provided in the disclosure can measure the temperature of at least one target, such as a living body or other specific objects, in a monitored area, and calculate the distance between the thermal imaging apparatus and the target to calibrate the measured temperature of the target, so as to obtain the value closer to the real temperature of the target. Please refer to FIG. 1, which is a functional block diagram of a thermal imaging apparatus according to an embodiment of the disclosure. As shown in FIG. 1, the thermal imaging apparatus 1 includes a thermal imager 11, an optical image capturing device 13, and a computing processing device 15, wherein the computing processing device 15 is connected to the thermal imager 11 and the optical image capturing device 13 in a wired or wireless manner. The thermal imager 11 may be an infrared thermal imager which is configured to perform thermal imaging towards the monitored area to capture one or more thermal images of the monitored area. The optical image capturing device 13 is, for example, a color (RGB) camera. The optical image capturing device 13 is configured to perform optical imaging (e.g. color photography) towards the monitored area to capture optical images (e.g. color photos) of the monitored area.

The computing processing device 15 includes a processing element such as a central processing unit, a microcontroller, a programmable logic controller, etc., and can be configured to perform: determining one of the multiple optical images synchronizing with the thermal image according to the positions of the blocks corresponding to the target in the thermal image and the optical images; performing calculation according to the thermal image and the determined optical image to obtain the distance between the target and the thermal imaging apparatus 1 (hereinafter called "measured distance"); and performing calibration to obtain the calibrated temperature value of the target according to the measured distance and the thermal image. The detailed content of the calculation and calibration is described later. Moreover, the computing processing device 15 can output the calibrated temperature value through the user interface or communication interface after obtaining the calibrated temperature value, or compare the calibrated temperature value with a preset threshold value indicating abnormal body temperature, and then output the result through the user interface or communication interface.

In particular, with the joint operation of the thermal imager 11 and the optical image capturing device 13 and the specific calculation performed by the computing processing device 15 based on the thermal image and the optical image, the thermal imaging apparatus 1 may obtain the distance between the target and the thermal imaging apparatus 1 to perform the subsequent temperature calibration without setting up a rangefinder, thereby reducing the cost of equipment. Moreover, generally speaking, the frame rate (frames per second, FPS) of the thermal imager 11 is lower than the frame rate of the optical image capturing device 13 (e.g. 1:6). That is to say, there is a one-to-many mapping relationship between the image data of these two hardware components, and some of the optical images obtained in the same time interval as the thermal image may not synchronize with the thermal image. When the target shifts during the shooting time of the thermal image and the optical images used to calculate the distance between the target and the thermal imaging apparatus 1, errors will appear in the distance calculation, causing errors in the subsequent temperature calibration. With the processing device 15 performing the determination of the optical image corresponding to the thermal image based on the positions of the blocks corresponding to the target in the images, the thermal imaging apparatus 1 can obtain the thermal image and optical image with the highest degree of synchronization for the subsequent distance calculation and temperature calibration, which may avoid the above-mentioned problem caused by unsynchronized image capturing, and improve the accuracy of temperature estimation.

Figure 2A:
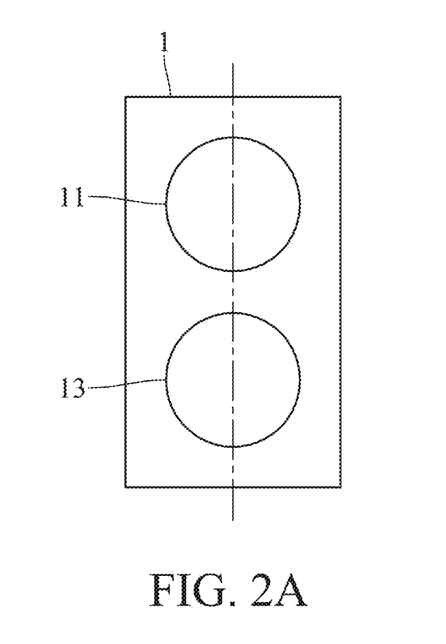
FIG. 2A is a schematic front view of a thermal imaging apparatus according to an embodiment of the disclosure.
Figure 2B:
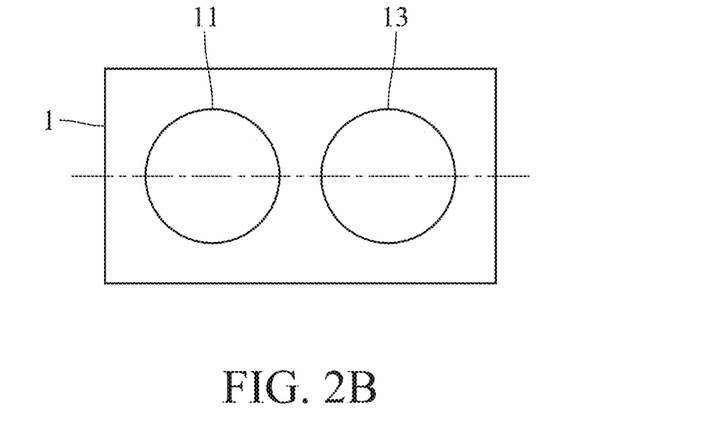
FIG. 2B is a schematic front view of a thermal imaging apparatus according to another embodiment of the disclosure.

FIG. 1 shows an exemplary functional block diagram of the thermal imaging apparatus 1. Further, the disclosure also proposes specific arrangements of the imaging elements of the thermal imaging apparatus 1 in space. Please refer to FIG. 1, FIG. 2A and FIG. 2B together, wherein FIG. 2A is a schematic front view of a thermal imaging apparatus 1 according to an embodiment of the disclosure, and FIG. 2B is a schematic front view of a thermal imaging apparatus 1 according to an embodiment of the disclosure. In the embodiment of FIG. 2A, the thermal imager 11 and the optical image capturing device 13 are aligned vertically. More particularly, the sensor of the thermal imager 11 and the lens of the optical image capturing device 13 are aligned vertically, which indicates that the connection direction of the centers of the sensor of the thermal imager 11 and the lens of the optical image capturing device 13 is approximately parallel to the direction of gravity. Specifically, an angle difference tolerance within ±45 degrees is allowed to exist between the connection direction of the centers of the sensor of the thermal imager 11 and the lens of the optical image capturing device 13 and the direction of gravity. In the embodiment of FIG. 2B, the thermal imager 11 and the optical image capturing device 13 are aligned horizontally. More particularly, the sensor of the thermal imager 11 and the lens of the optical image capturing device 13 are aligned horizontally, which indicates that the connection direction of the centers of the sensor of the thermal imager 11 and the lens of the optical image capturing device 13 is approximately perpendicular to the direction of gravity. Specifically, an angle difference tolerance within ±45 degrees is allowed to exist between the connection direction of the centers of the sensor of the thermal imager 11 and the lens of the optical image capturing device 13 and the horizontal line perpendicular to the direction of gravity.

With the above arrangement, the calculation processing device 15 can perform calculation using the target positions in the thermal image and the optical image corresponding to the thermal image based on the parallax between the thermal imager 11 and the optical image capturing device 13, so as to obtain the distance between the target and the thermal imaging apparatus 1. The detailed content of the calculation is described later. It should be noted that FIGS. 2A and 2B merely illustrate that the thermal imager 11 and the optical image capturing device 13 of the thermal imaging apparatus 1 are aligned vertically or horizontally, and are not intended to limit the thermal imager 11 to being disposed on the optical image capturing device 13, not intended to limit the thermal imager 11 to being disposed on the left side of the optical image capturing device 13, and not intended to limit the sizes or shapes of the thermal imager 11 and the optical image capturing device 13.

Figure 3:
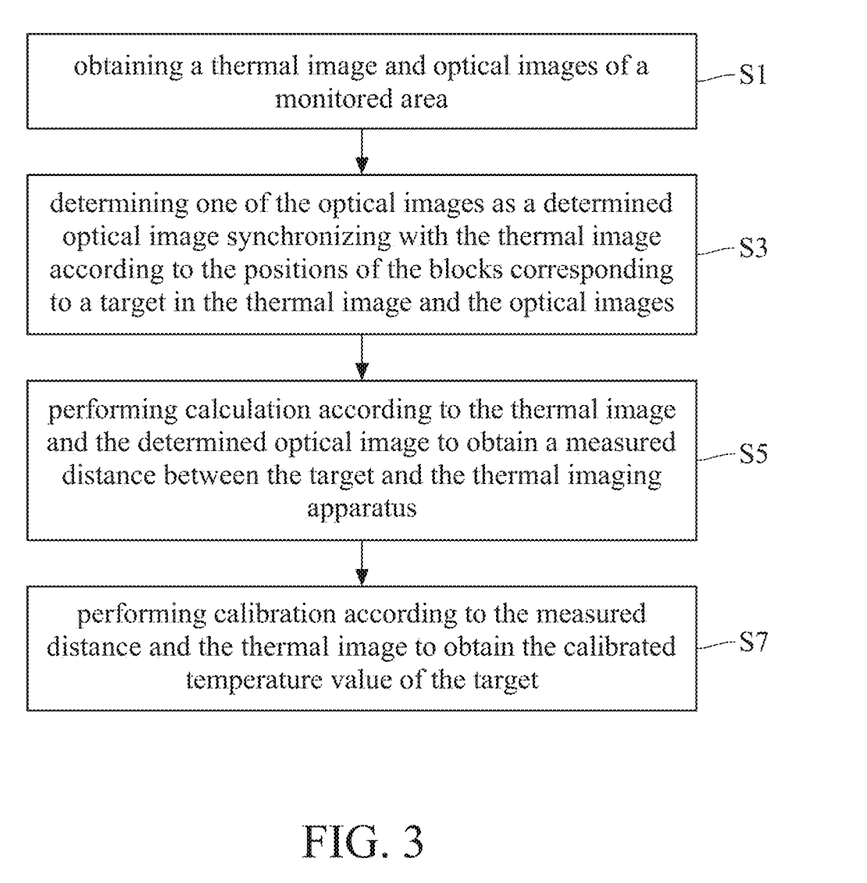
FIG. 3 is a flow chart of a temperature calibration method according to an embodiment of the disclosure.

The disclosure also provides a temperature calibration method of a thermal imaging apparatus, which is applicable to the thermal imaging apparatus 1. Please refer to FIG. 1 and FIG. 3 together, wherein FIG. 3 is a flowchart of a temperature calibration method of the thermal imaging apparatus 1 according to an embodiment of the disclosure. As shown in FIG. 3, the temperature calibration method includes step S1, obtaining a thermal image and optical images of a monitored area; step S3, determining one of the optical images as a determined optical image synchronizing with the thermal image according to the positions of the blocks corresponding to a target in the thermal image and the optical images; step S5, performing calculation according to the thermal image and the determined optical image to obtain a measured distance between the target and the thermal imaging apparatus 1; and step S7, performing calibration according to the measured distance and the thermal image to obtain the calibrated temperature value of the target.

In step S1, the computing processing device 15 of the thermal imaging apparatus 1 obtains a thermal image from the thermal imager 11 and obtains multiple optical images from the optical image capturing device 13. More particularly, when the thermal imaging apparatus 1 is in operation, the thermal imager 11 continuously captures thermal images of the monitored area at a first frame rate, the optical image capturing device 13 continuously captures optical images of the monitored area at a second frame rate, and the computing processing device 15 determines the ratio of the number of thermal images to be used to the number of optical images to be used according to the ratio of the first frame rate to the second frame rate. For example, if the first frame rate is 5 fps and the second frame rate is 30 fps, the computing processing device 15 will take 6 optical images every time the computing processing device 15 takes a thermal image for the determination of the correspondence relationship in the subsequent step S3.

Moreover, the generation time of the thermal image (i.e. the time when this thermal image is shot by the thermal imager 11) taken by the computing processing device 15 may be the same or similar to the generation time of the first generated optical image (i.e. the time when this optical image is shot by the optical image capturing device 13) among the optical images taken by the computing processing device 15; or, the generation time of the thermal image taken by the computing processing device 15 may be the same or similar to the generation time of the last generated optical image among the optical images taken by the computing processing device 15; or, the generation of the thermal image taken by the computing processing device 15 may be between the generation time of the first generated optical image and the generation time of the last generated optical image, preferably the intermediate time.

In step S3, the computing processing device 15 determines one of the optical images as the determined optical image synchronizing with the thermal image according to the positions of the blocks corresponding to the target in the thermal image and the optical images. It should be noted that the situation in which an optical image is determined synchronizing with a thermal image indicates the thermal image and the optical image are generated at the same time or the closest time. For a further description of the implementation of step S3, please refer to FIGS. 4A and 4B, wherein FIG. 4A is a schematic diagram of the operation of determining the optical image synchronizing with the thermal image in the temperature calibration method according to an embodiment of the disclosure, and FIG. 4B is a schematic diagram of the operation of determining the optical image synchronizing with the thermal image in the temperature calibration method of the thermal imaging apparatus according to another embodiment of the disclosure.

Figure 4A:
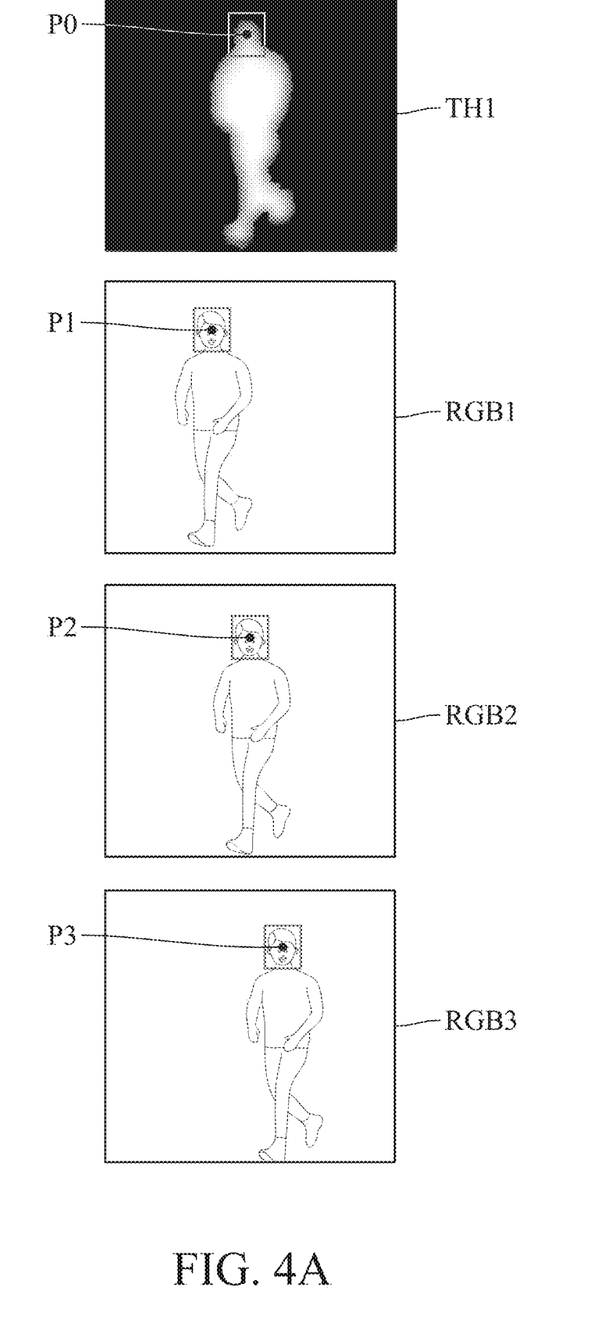
FIG. 4A is a schematic diagram of the operation of determining the optical image synchronizing with the thermal image according to an embodiment of the disclosure.

In the embodiment shown in FIG. 4A, the step of determining one of the optical images as the determined optical image synchronizing with the thermal image according to the positions of the blocks corresponding to a target in the thermal image and the optical images performed by the computing processing device 15 (step S3 in FIG. 3) includes: calculating the distances between each of the coordinates of the blocks corresponding to the target in the optical images RGB1-RGB3 and the coordinate of the block corresponding to the target in the thermal image TH1, and determining that one of the optical images RGB1-RGB3 which has the shortest distance as the determined optical image synchronizing with the thermal image TH1, wherein each of the distances is calculated along the direction of the x-axis (x-axis direction) or the direction of the y-axis (y-axis direction). FIG. 4A exemplarily shows a living body as the target, and in the embodiment of FIG. 4A, each of the distances is calculated using the coordinates of the geometric centers of the blocks corresponding to the head of the living body in the optical images and the thermal image. In detail, the computing processing device 15 can obtain the coordinate of the geometric center P0 of the block corresponding to the head of the living body in the thermal image TH1, and the coordinates of the geometric centers P1-P3 of the blocks corresponding to the head of the living body in the optical images RGB1-RGB3, wherein the coordinates of the geometric centers P0 and P1-P3 are in the same coordinate system, and the computing processing device 15 can calculate the distance between the coordinates of the geometric centers P1 and P0, the distance between the coordinates of the geometric centers P2 and P0, and the distance between the coordinates of the geometric centers P3 and P0. More particularly, for the thermal imaging apparatus 1 in which the optical image capturing device and the thermal imager are aligned vertically as shown in FIG. 2A, each of the distances between the coordinates is calculated along the x-axis direction, and that is, the differences between each of the x coordinates of the geometric centers P1-P3 and the x coordinate of the geometric center P0 are calculated as the aforementioned distances; for the thermal imaging apparatus 1 in which the optical image capturing device and the thermal imager are aligned horizontally as shown in FIG. 2B, the distance between the coordinates is calculated along the y-axis direction, and that is, the differences between each of the y coordinates of the geometric centers P1-P3 and the y coordinate of the geometric center P0 are calculated as the aforementioned distances. Then, the computing processing device 15 determines that one of the optical images RGB1-RGB3 which has the smallest distance as the determined optical image synchronizing with the thermal image TH1; that is, the computing processing device 15 determines the optical image RGB2 which has the smallest distance as the determined optical image synchronizing with the thermal image TH1.

For example, the computing processing device 15 can recognize one or more hot regions with a general living body temperature (e.g. 34-40 degrees Celsius) and regard the top part of each of the hot regions as the block corresponding to the head of the living body, and can identify the blocks corresponding to the head of the living body in the optical images RGB1-RGB3 by facial positioning (e.g. skin color detection, facial feature detection or other kinds of detection for AI recognition). In other embodiments, the computing processing device 15 can be set to calculate the distance using the coordinates of the blocks corresponding to other parts of the living body. Moreover, it should be noted that FIG. 4A exemplarily shows three optical images RGB1-RGB3, and is not intended to limit the number of optical images taken by the computing processing device 15 for the comparison with the thermal image.

Figure 4B:
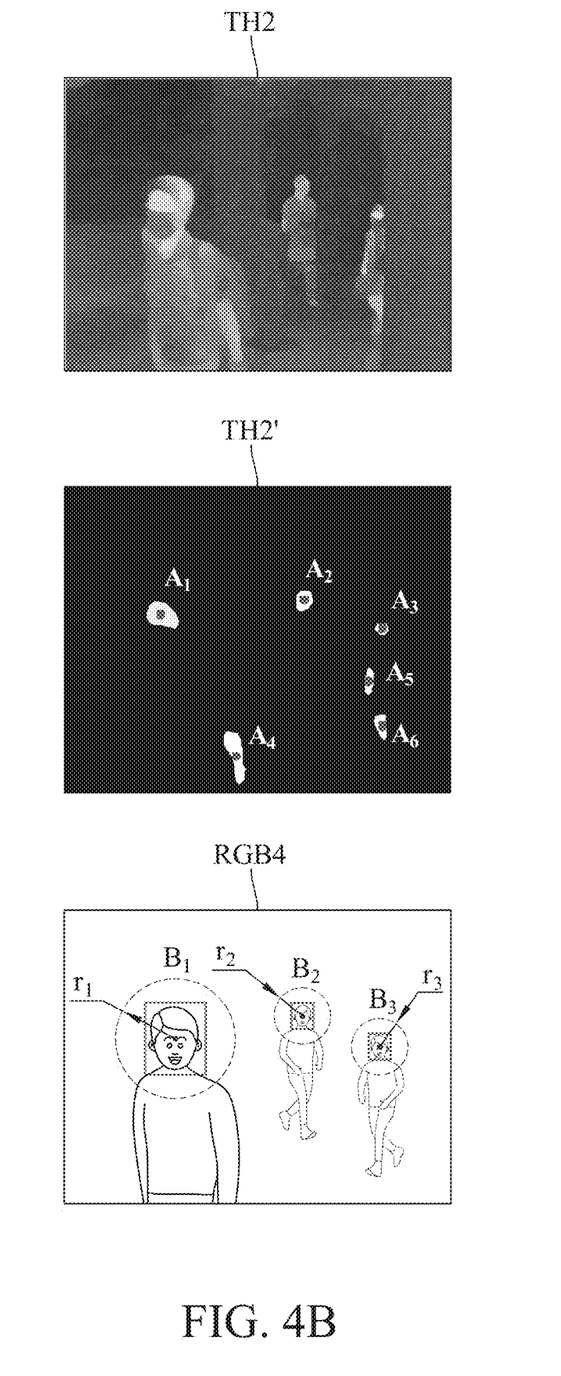
FIG. 4B is a schematic diagram of the operation of determining the optical image synchronizing with the thermal image according to an embodiment of the disclosure.

In the embodiment shown in FIG. 4B, the step of determining one of the optical images as the determined optical image synchronizing with the thermal image according to the positions of the blocks corresponding to a target in the thermal image and the optical images performed by the computing processing device 15 (step S3 in FIG. 3) includes: obtaining the coordinate (first coordinate) corresponding to the head of the living body in the thermal image TH2, obtaining the coordinates (second coordinates) corresponding to the head of the living body in optical images RGB4, calculating the deviations of each of the second coordinates in optical images RGB4 from the first coordinate in the thermal image TH2, and determining that one of the optical images RGB4 which has the smallest deviation as the determined optical image synchronizing with the thermal image TH2. The above-mentioned deviations are calculated along the x-axis direction or the y-axis direction. In detail, the computing processing device 15 may first process the thermal image TH2 to capture one or more hot regions each of which has the temperature in a specific temperature range (e.g. 34-40 degrees Celsius) in the thermal image TH2 and generate a thermal image TH2' containing the captured hot regions (with geometric centers $A_1$-$A_6$ respectively). Then, the computing processing device 15 calculates the coordinates of blocks (with geometric centers $A_1$-$A_3$ respectively) corresponding to the head of the living body in the hot regions. For example, the computing processing device 15 may use the y coordinate of the head of the living body in the images as the filtering condition. Then, the computing processing device 15 uses the coordinates of the hot regions (with geometric centers $A_1$-$A_3$ respectively) corresponding to the head of the living body in the thermal image TH2' and the coordinates of the blocks (with geometric centers $B_1$-$B_3$) corresponding to the head of the living body in the optical image RGB4 to calculate the above-mentioned deviation.

More particularly, for the thermal imaging apparatus 1 in which the optical image capturing device and the thermal imager are aligned vertically as shown in FIG. 2A, the deviation is calculated along the x-axis direction, and the formula for calculating the deviation can be:

$$T = \arg\min_t E(t) = \arg\left\{\min_t\left[\frac{1}{k}\sum_{i=1}^{k}(B_{ix}^t - A_{jx})^2\right] \middle| A_j \text{ in } r_i \text{ circle range}\right\}$$

wherein $B_{ix}$ represents the x coordinate of the geometric center of the block corresponding to the head in an optical image candidate (e.g. optical image RGB4 in FIG. 4B); $A_{jx}$ represents the x coordinate of the geometric center of the hot region in the thermal image TH2', k represents the number of the geometric center(s) of the block(s) corresponding to the head in the optical image candidate; t represents the serial number of the optical image candidate; T represents the serial number of the optical image which is determined as synchronizing with the thermal image; $r_i$ represents the appropriate radius of the $i^{th}$ head in the optical image candidate. Moreover, for the thermal imaging apparatus 1 in which the optical image capturing device and the thermal imager are aligned horizontally as shown in FIG. 2B, the deviation is calculated along the y-axis direction; that is, the parameters associated with the x coordinate in the above formula are changed to be associated with y coordinate. It should be noted that FIG. 4B exemplarily shows one of the optical images RGB4 among the optical images used for the comparison with the thermal image, and is not intended to limit the number of the optical images taken by the computing processing device 15 for the comparison with the thermal image. In other words, the optical images taken by the computing processing device 15 for the comparison with the thermal image can each be regarded as an optical image candidate for the calculation of the above formula.

After performing step S3 in FIG. 3 to obtain the thermal image and the optical image synchronizing with each other, the computing processing device 15 performs step S5 to calculate the distance between the living body and the thermal imaging apparatus 1. As mentioned before, in step S5, the computing processing device 15 performs calculation according to the thermal image and the optical image to obtain the measured distance between the target and the thermal imaging apparatus 1. In particular, the computing processing device 15 can calculate the measured distance between the target and the thermal imaging apparatus 1 according to the imaging position of the target in the thermal image, the x or y coordinate of the imaging position of the target in the optical image, the focal length of the thermal imager 11, the focal length of the optical image capturing device 13, and the distance between the sensor of the thermal imager 11 and the lens of the optical image capturing device 13.

More particularly, they coordinate of the imaging position of the target in an image can be obtained by calculating the distance between the position corresponding to the top of the head of the target in the image and the upper edge of the image or the distance between the geometric center of the head of the target in the image and the upper edge of the image by the computing processing device 15. The x coordinate of the imaging position of the target in the image can be obtained by calculating the distance between the position corresponding to the top of the head of the target in the image and the side edge of the image or the distance between the geometric center of the head of the target in the image and the side edge of the image by the computing processing device 15. The focal length of the thermal imager 11 optical image capturing device 13 can be pre-stored in the memory of the computing processing device 15 or an external database, or be obtained by the computing processing device 15 performing image calibration on the thermal image/optical image. The distance between the sensor of the thermal imager 11 and the lens of the optical image capturing device 13 can be pre-stored in the memory of the computing processing device 15 or an external database. The formula used to calculate the measured distance can be:

$$Z = \frac{Bf^{RGB}}{\frac{f^{RGB}}{f^T}y^T - y^{RGB}}$$

wherein Z represents the measured distance; $y^T$ represents the y coordinate of the imaging position of the target in the thermal image; $y^{RGB}$ represents the y coordinate of the imaging position of the target in the optical image; $f^T$ represents the focal length of the thermal imager 11; $f^{RGB}$ represents the focal length of the optical image capturing device 13; B represents the distance between the sensor of the thermal imager 11 and the lens of the optical image capturing device 13. In particular, $$\frac{f^{RGB}}{f^T}y^T - y^{RGB}$$

represents the parallax between the sensor of the thermal imager 11 and the lens of the optical image capturing device 13, so the above formula can be regarded as a parallax model. Due to the simple calculation of the above formula, the computing processing device 15 of the thermal imaging apparatus 1 may not need to have a high calculation capability, so it can be implemented by a lower-cost processor, thereby reducing equipment cost.

Figure 5:
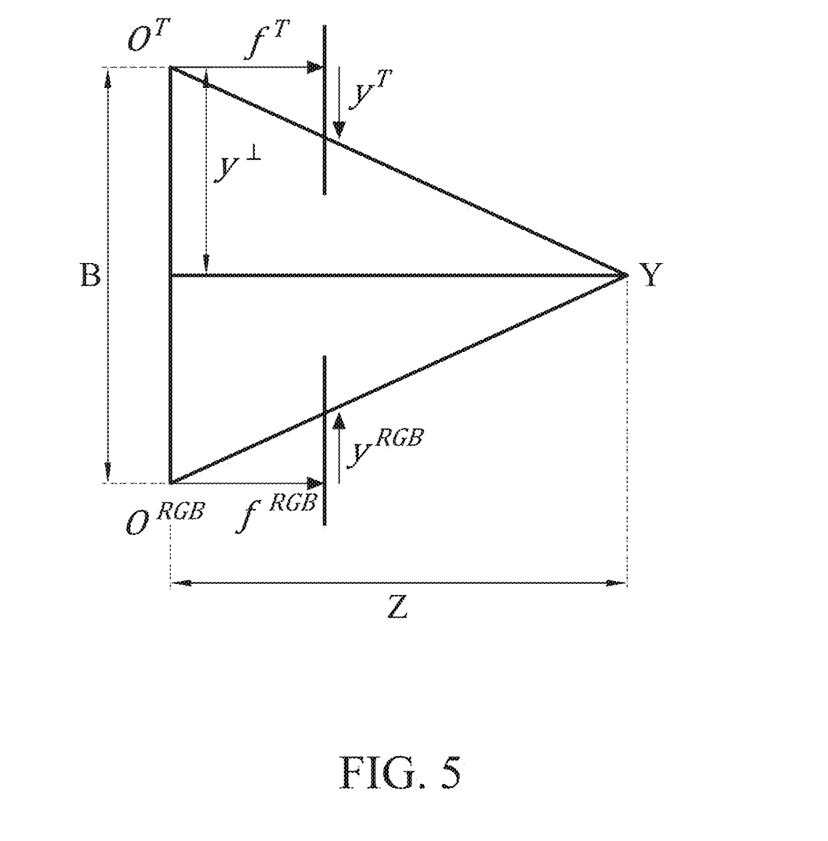
FIG. 5 is a schematic diagram of the algorithm for calculating the measured distance between a target and the thermal imaging apparatus according to an embodiment of the disclosure.

The above formula can be derived based on the geometry of similar triangles. Please refer to FIG. 5, which is a schematic diagram for calculating the measured distance between the target and the thermal imaging apparatus in the temperature calibration method according to an embodiment of the disclosure. FIG. 5 exemplarily shows the center of the sensor of the thermal imager (sensor center $O^T$), the center of the lens of the optical image capturing device (lens center $O^{RGB}$), the distance B between the sensor center $O^T$ and the lens center $O^{RGB}$, the actual position Y of the target in the monitored area, the distance $y^\perp$ between the target and the thermal imager on the vertical direction, the measured distance Z, the focal length $f^T$ of the thermal imager, the focal length $f^{RGB}$ of the optical image capturing device, the relation between the imaging position $y^T$ of the target in the thermal image and the imaging position $y^{RGB}$ of the target in the optical image on the z-axis plane. Based on FIG. 5 and the theorem about similar triangles, the following two equations can be obtained:

$$\frac{f^T}{y^T} = \frac{Z}{y^\perp}$$

$$\frac{f^{RGB}}{y^{RGB}} = \frac{Z}{|y^\perp - B|}$$

According to the above equations, the aforementioned formula used to calculate the measured distance can be derived.

The above-mentioned distance calculation method based on the algorithm shown in FIG. 5 is applicable to the thermal imaging apparatus 1 in which the optical image capturing device and the thermal imager are aligned vertically as shown in FIG. 2A. For the thermal imaging apparatus 1 in which an angle difference smaller than the aforementioned angle difference tolerance exists between the vertical line and the line connecting the sensor of the thermal imager 11 and the lens of the optical image capturing device 13, the computing processing device 15 can first perform image calibration on the thermal image and the optical image to compensate for the angle difference, and then, perform the distance calculation mentioned in the above embodiments. As for the thermal imaging apparatus 1 in which the optical image capturing device and the thermal imager are aligned horizontally as shown in FIG. 2B, the applicable distance calculation method is based on the algorithm which is approximately the same as that shown in FIG. 5, wherein the difference is that the distance calculation based on the y coordinate is changed to the distance calculation based on the x coordinate. More particularly, the formula used to calculate the measured distance can be:

$$Z = \frac{Bf^{RGB}}{\frac{f^{RGB}}{f^T} x^T - x^{RGB}}$$

wherein Z represents the measured distance; $x^T$ represents the x coordinate of the imaging position of the target in the thermal image; $x^{RGB}$ represents the x coordinate of the imaging position of the target in the optical image; $f^T$ represents the focal length of the thermal imager 11; $f^{RGB}$ represents the focal length of the optical image capturing device 13; B represents the distance between the sensor of the thermal imager 11 and the lens of the optical image capturing device 13.

In step S7, the computing processing device 15 performs calibration according to the measured distance and the thermal image to obtain the calibrated temperature value of the target. More particularly, the computing processing device 15 determines that the thermal image has a sensed temperature value corresponding to the target, consults a distance temperature calibration table according to the measured distance to obtain a compensation temperature value, and then performs calculation (e.g. addition) on the sensed temperature value and the compensation temperature value to obtain the calibrated temperature value. The distance temperature calibration table can be stored in the memory of the computing processing device 15 or can be obtained from an external database. Table 1 as shown below exemplarily presents the distance temperature calibration table. For example, when the sensed temperature value corresponding to the target in the thermal image is 36.1 degrees Celsius and the distance between the target and the thermal imaging apparatus 1 is 1.5 meters, the calibrated temperature value obtained by the computing processing device 15 performing the calibration is 36.6 degrees Celsius.

TABLE 1

| measured distance (m) | compensation temperature value (° C.) |
|---|---|
| 1 | 0 |
| 1.5 | 0.5 |
| 2 | 1.1 |

In view of the above description, by setting up a thermal imager and an optical image capturing device with the specific calculation, the thermal imaging apparatus and the temperature calibration method in the disclosure may perform temperature calibration without setting up a rangefinder, thereby reducing the cost of equipment. Through the specific method for determining the optical image synchronizing with the thermal image, the thermal imaging apparatus and the temperature calibration method in the disclosure may obtain the thermal image and the optical image which are generated at the closest time for the subsequent distance calculation and temperature calibration, thereby improving the accuracy of temperature estimation.

What is claimed is:

1. A thermal imaging apparatus for measuring a temperature of a target in a monitored area, comprising:
   a thermal imager configured to capture a thermal image of the monitored area;
   an optical image capturing device configured to capture optical images of the monitored area; and
   a computing processing device connected to the thermal imager and the optical image capturing device, and configured to perform steps comprising:
      determining one of the optical images as a determined optical image synchronizing in time with the thermal image according to positions of blocks corresponding to the target in the thermal image and the optical images;
      performing calculation according to the thermal image and the determined optical image to obtain a measured distance between the target and the thermal imaging apparatus; and
      performing calibration according to the measured distance and the thermal image to obtain a calibrated temperature value of the target,
   wherein determining one of the optical images as the determined optical image synchronizing with the thermal image according to the positions of the blocks corresponding to the target in the thermal image and the optical images that the computing processing device is configured to perform comprises:
      determining a plurality of differences between the block corresponding to the target of the thermal image and the blocks corresponding to the target of the optical images; and
      using one of the optical images with a smallest difference among the differences as the determined optical image synchronizing with the thermal image.

2. The thermal imaging apparatus according to claim 1, wherein a sensor of the thermal imager and a lens of the optical image capturing device are horizontally aligned.

3. The thermal imaging apparatus according to claim 2, wherein performing the calculation according to the thermal image and the determined optical image to obtain the measured distance between the target and the thermal imaging apparatus that the computing processing device is configured to perform comprises: performing calculation according to a formula to obtain the measured distance, wherein the formula is:

$$Z = \frac{Bf^{RGB}}{\frac{f^{RGB}}{f^T}x^T - x^{RGB}}$$

wherein Z represents the measured distance, $x^T$ represents a x coordinate of an imaging position of the target in the thermal image, $x^{RGB}$ represents an x coordinate of an imaging position of the target in the determined optical image, $f^T$ represents a focal length of the thermal imager, $f^{RGB}$ represents a focal length of the optical image capturing device, and B represents a distance between the thermal imager and the optical image capturing device.

4. The thermal imaging apparatus according to claim 1, wherein a sensor of the thermal imager and a lens of the optical image capturing device are vertically aligned.

5. The thermal imaging apparatus according to claim 4, wherein performing the calculation according to the thermal image and the determined optical image to obtain the measured distance between the target and the thermal imaging apparatus that the computing processing device is configured to perform comprises: performing calculation according to a formula to obtain the measured distance, wherein the formula is:

$$Z = \frac{Bf^{RGB}}{\frac{f^{RGB}}{f^T}y^T - y^{RGB}}$$

wherein Z represents the measured distance, $y^T$ represents a y coordinate of an imaging position of the target in the thermal image, $y^{RGB}$ represents a y coordinate of an imaging position of the target in the determined optical image, $f^T$ represents a focal length of the thermal imager, $f^{RGB}$ represents a focal length of the optical image capturing device, and B represents a distance between the thermal imager and the optical image capturing device.

6. The thermal imaging apparatus according to claim 1, wherein
determining the plurality of differences between the block corresponding to the target of the thermal image and the blocks corresponding to the target of the optical images that the computing processing device is configured to perform comprises: calculating a plurality of distances between each of coordinates of the blocks corresponding to the target in the optical images and a coordinate of the block corresponding to the target in the thermal image, and
using one of the optical images with the smallest difference among the differences as the determined optical image synchronizing with the thermal image that the computing processing device is configured to perform comprises: determining one of the optical images which has a shortest distance as the determined optical image synchronizing with the thermal image, wherein each of the distances is calculated along an x-axis direction or a y-axis direction.

7. The thermal imaging apparatus according to claim 1, wherein the target is one living body, and
determining the plurality of differences between the block corresponding to the target of the thermal image and the blocks corresponding to the target in the thermal of the optical images that the computing processing device is configured to perform comprises: obtaining a first coordinate corresponding to a head of the living body in the thermal image, obtaining a plurality of second coordinates corresponding to the head of the living body in the optical images, calculating a plurality of deviations of each of the second coordinates in the optical images from the first coordinate, and
using one of the optical images with the smallest difference among the differences as the determined optical image synchronizing with the thermal image that the computing processing device is configured to perform comprises: determining one of the optical images which has a smallest deviation as the determined optical image synchronizing with the thermal image, wherein each of the deviations is calculated along an x-axis direction or a y-axis direction.

8. The thermal imaging apparatus according to claim 1, wherein the thermal image has a sensed temperature value corresponding to the target, and performing the calibration according to the measured distance and the thermal image to obtain the calibrated temperature value of the target that the computing processing device is configured to perform comprises: performing the calibration on the sensed temperature value according to a distance temperature calibration table and the measured distance to obtain the calibrated temperature value of the target.

9. A temperature calibration method of a thermal imaging apparatus, applicable for the thermal imaging apparatus for obtaining a temperature of one target in a monitored area, the temperature calibration method comprising:
obtaining a thermal image in the monitored area;
obtaining optical images in the monitored area;
determining one of the optical images as a determined optical image synchronizing in time with the thermal image according to positions of blocks corresponding to the target in the thermal image and the optical images;
performing calculation according to the thermal image and the determined optical image to obtain a measured distance between the target and the thermal imaging apparatus; and
performing calibration according to the measured distance and the thermal image to obtain a calibrated temperature value of the target,
wherein determining one of the optical images as the determined optical image synchronizing with the thermal image according to the positions of the blocks corresponding to the target in the thermal image and the optical images comprises:
determining a plurality of differences between the block corresponding to the target of the thermal image and the blocks corresponding to the target of the optical images; and
using one of the optical images with a smallest difference among the differences as the determined optical image synchronizing with the thermal image.

10. The temperature calibration method according to claim 9, wherein a sensor of the thermal imager and a lens of an optical image capturing device are aligned horizontally.

11. The temperature calibration method according to claim 10, wherein performing the calculation according to the thermal image and the determined optical image to obtain the measured distance between the target and the thermal imaging apparatus comprises:
performing calculation according to a formula to obtain the measured distance, wherein the formula is:

$$Z = \frac{Bf^{RGB}}{\frac{f^{RGB}}{f^T}x^T - x^{RGB}}$$

wherein Z represents the measured distance, $x^T$ represents a x coordinate of an imaging position of the target in the thermal image, $x^{RGB}$ represents an x coordinate of an imaging position of the target in the determined optical image, $f^T$ represents a focal length of the thermal imager, $f^{RGB}$ represents a focal length of the optical image capturing device, and B represents a distance between the thermal imager and the optical image capturing device.

12. The temperature calibration method according to claim 9, wherein a sensor of the thermal imager and a lens of an optical image capturing device configured to capture the optical images are aligned vertically.

13. The temperature calibration method according to claim 12, wherein performing the calculation according to the thermal image and the determined optical image to obtain the measured distance between the target and the thermal imaging apparatus comprises:
performing calculation according to a formula to obtain the measured distance, wherein the formula is:

$$Z = \frac{Bf^{RGB}}{\frac{f^{RGB}}{f^T}y^T - y^{RGB}}$$

wherein Z represents the measured distance, $y^T$ represents a y coordinate of an imaging position of the target in the thermal image, $y^{RGB}$ represents a y coordinate of an imaging position of target in the determined optical image, $f^T$ represents a focal length of the thermal imager, $f^{RGB}$ represents a focal length of the optical image capturing device, and B represents a distance between the thermal imager and the optical image capturing device.

14. The temperature calibration method according to claim 9, wherein determining the plurality of differences between the block corresponding to the target of the thermal image and the blocks corresponding to the target of the optical images comprises: calculating a plurality of distances between each of the coordinates of the blocks corresponding to the target in the optical images and a coordinate of the block corresponding to the target in the thermal image, and using one of the optical images with the smallest difference among the differences as the determined optical image synchronizing with the thermal image comprises: determining one of the optical images which has a shortest distance as the determined optical image synchronizing with the thermal image, wherein each of the distances is calculated along an x-axis direction or a y-axis direction.

15. The temperature calibration method according to claim 9, wherein the target is one living body, and
determining the plurality of differences between the block corresponding to the target of the thermal image and the blocks corresponding to the target in the thermal of the optical images comprises:
obtaining a first coordinate corresponding to a head of the living body in the thermal image;
obtaining a plurality of second coordinates corresponding to the head of the living body in the optical images;
calculating a plurality of deviations of the second coordinates in the optical images from the first coordinate; and
using one of the optical images with the smallest difference among the differences as the determined optical image synchronizing with the thermal image comprises:
determining one of the optical images which has a smallest deviation as the determined optical image synchronizing with the thermal image;
wherein each of the deviations is calculated along an x-axis direction or a y-axis direction.

16. The temperature calibration method according to claim 9, wherein the thermal image has a sensed temperature value corresponding to the target, and performing the calibration according to the measured distance and the thermal image to obtain the calibrated temperature value of the target comprises:
performing the calibration on the sensed temperature value according to a distance temperature calibration table and the measured distance to obtain the calibrated temperature value of the target.

* * * * *